United States Patent
Venable, Sr.

(10) Patent No.: US 10,404,730 B1
(45) Date of Patent: Sep. 3, 2019

(54) HIGH-VOLUME NETWORK THREAT TRACE ENGINE

(71) Applicant: Vectra Networks, Inc., San Jose, CA (US)

(72) Inventor: Jeffrey Charles Venable, Sr., Union City, CA (US)

(73) Assignee: Vectra Networks, Inc., San Jose, CA (US)

( * ) Notice: Subject to any disclaimer, the term of this patent is extended or adjusted under 35 U.S.C. 154(b) by 136 days.

(21) Appl. No.: 15/438,489

(22) Filed: Feb. 21, 2017

Related U.S. Application Data (60) Provisional application No. 62/298,112, filed on Feb. 22, 2016.

(51) Int. Cl.
*G06F 21/00* (2013.01)
*H04L 29/06* (2006.01)
*G06F 21/50* (2013.01)

(52) U.S. Cl.
CPC ......... *H04L 63/1425* (2013.01); *G06F 21/50* (2013.01); *H04L 63/1433* (2013.01); *H04L 63/1416* (2013.01); *H04L 63/20* (2013.01)

(58) Field of Classification Search
CPC ..... H04L 12/1439; H04L 63/02; H04L 12/66; H04L 67/12; H04L 67/18
See application file for complete search history.

(56) References Cited

U.S. PATENT DOCUMENTS

| | | | | |
|---|---|---|---|---|
| 8,479,057 | B2 * | 7/2013 | Poletto | H04L 41/0893 709/224 |
| 2009/0100169 | A1 * | 4/2009 | Allen | G06F 15/173 709/224 |
| 2012/0005754 | A1 * | 1/2012 | Lin | H04L 29/0653 726/24 |

\* cited by examiner

*Primary Examiner* — Ghazal B Shehni
(74) *Attorney, Agent, or Firm* — Vista IP Law Group, LLP (57) ABSTRACT

An approach for high-volume network threat tracing and detection may be implemented by storing network communications received from a plurality of hosts in an initial recording data structure, such as a rolling buffer. Identifiers may be generated for the plurality of hosts associated with the network communications by according to host identity or the behavior of a given host. Extended trace time values may be assigned to a portion of the plurality of hosts based at least in part on the identifiers, and storing the portion of the network communications that have extended trace time values may be recorded as packet capture files in long term memory.

23 Claims, 6 Drawing Sheets

HIGH-VOLUME NETWORK THREAT TRACE ENGINE

RELATED APPLICATIONS

The present application claims the benefit of priority to U.S. Provisional Application No. 62/298,112, entitled "HIGH-VOLUME NETWORK THREAT TRACE ENGINE", filed on Feb. 22, 2016, which is hereby incorporated by reference in its entirety.

BACKGROUND

In computer and network security, packet captures (PCAPs), which record packets sent between networked computers, are a useful tool that provide forensic detail. However, modern networking equipment has advanced to handle speeds exceeding 40-100 Gbps/sec and the increased speeds have made it difficult for network security devices and input/output (I/O) storage devices to keep pace. Further, network security devices deployed to monitor large virtual environments comprising potentially multitudes of virtualized computers (e.g., virtual machines (VMs), containers) have found it impractical if not infeasible to capture all network traffic and store it for tracing purposes.

As is evident, there is a demand for improved approaches for network tracking, storage, and analysis.

SUMMARY

In some embodiments, an approach for high-volume network threat tracing may be implemented by tagging and storing network packets received from a plurality of network hosts or endpoints to a rolling buffer. The packets may receive an initial tag that corresponds to a trace time value for the host that generated the packets. When a trace time value expires, received packets from the corresponding host are no longer tagged and/or stored in the buffer. In some embodiments, all network hosts or endpoints receive an initial expirable trace time value of a relatively small initial period of time (e.g., five minutes). During or after the initial period of time, one or more machine learning algorithms, malware detectors, look-ups, host identifiers, and/or other algorithms may analyze the packets in the buffer to identify their corresponding hosts and determine whether any expirable trace time values should be extended or modified based on the identifications, as according to some embodiments. At the end of the initial period of time, packets received from hosts that have not had their expirable trace time values extended are removed from the rolling buffer and may be replaced by newer packets.

Further details of aspects, objects, and advantages of some embodiments are described below in the detailed description, drawings, and claims. Both the foregoing general description and the following detailed description are exemplary and explanatory, and are not intended to be limiting as to the scope of the embodiments.

BRIEF DESCRIPTION OF THE DRAWINGS

The drawings illustrate the design and utility of embodiments of the present invention, in which similar elements are referred to by common reference numerals. In order to better appreciate the advantages and objects of embodiments of the invention, reference should be made to the accompanying drawings. However, the drawings depict only certain embodiments of the invention, and should not be taken as limiting the scope of the invention.

DETAILED DESCRIPTION

In the following description, numerous specific details are set forth to provide a more thorough description of the specific examples described herein. It should be apparent, however, to one skilled in the art, that one or more other examples and/or variations of these examples may be practiced without all the specific details given below. In other instances, well known features have not been described in detail so as not to obscure the description of the examples herein. For ease of illustration, the same number labels are used in different diagrams to refer to the same items; however, in alternative examples the items may be different.

Before describing the examples illustratively depicted in the several figures, a general introduction is provided to further understanding. In some embodiments, an approach for high-volume network threat tracing is implemented by tagging and storing network packets received from a plurality of network hosts or endpoints to a rolling buffer. The packets may receive an initial tag that corresponds to an expirable trace time value for that host (e.g., the host that generated the packets). When a trace time value expires, packets from the corresponding host are no longer tagged and stored in the buffer. In this way, the rolling buffer may be constantly updated as old packets are removed as expired and new packets are received and stored for a short window of time. In some embodiments, all network hosts or endpoints receive an initial expirable trace time value for a relatively small initial window of time (e.g., five minutes). During or after the initial window of time one or more machine learning algorithms, malware detectors, look-ups, and/or other algorithms may analyze the packets in the buffer to identify their corresponding hosts or network endpoints and determine whether any expirable trace time values should be extended or modified based on the identifications. At the end of the initial period of time, packets received from hosts that have not had their expirable trace time values extended are no longer recorded in the buffer, thus saving a large amount of memory.

For example, assume packets from four hosts—Server A, Server B, Server C, and Server D—are initially received and stored to the rolling buffer. The rolling buffer may correspond to a window five minutes long, thus all packets received that are not previously identified are at least stored in the buffer for five minutes (or some other fixed or variable time window). During the five minutes, packets from Server A may be analyzed to determine that Server A issued the packets. Once identified, Server A may be further identified as a server that manages sensitive information. As a result, Server A may be re-assigned to a perpetual trace time value that does not expire. In effect, full packet capturing may be initiated on any packets sent to or coming from Server A.

The packet capture may be stored as one or more packet capture files, which may be stored in long term memory. In this way, high security tracking may be implemented to closely monitor sensitive endpoints and data.

In contrast, Server B may undergo a different path through the trace engine. Continuing the example, packets from Server B may be analyzed to determine that the packets are associated with Server B (downstream packets being sent from a client to server B, or upstream packets sent out from Server B to the client). One or more malware machine learning algorithms may perform analysis to determine that Server B's activity is anomalous; not so much so as to warrant an alert, but sufficient enough to warrant further monitoring. Accordingly, the trace engine may assign to Server B an extended trace time value. The extended trace time value extends the amount of time that packets associated with Server B are collected in a buffer. For example, initially packets from Server B are stored to rolling buffer that records packets for five minutes. However, once the extended trace time value is assigned, packets from server B may be directed to a rolling buffer with an extended time window, such as 30 minutes or 24 hours. During the extended time period, further analysis may be performed on Server B's packets to determine harmful or suspicious behavior. If harmful or suspicious behavior is identified, full packet capture may then be initiated on Server B, which may perpetually capture any packets going to and from Server B and storing them in long term memory for harmful or anomalous behavior or malware detection.

In contrast, Server C may undergo a different path through the trace engine. Packets from Server C may be analyzed to determine that the packets are associated with Server C. Unlike Server A, which was known to manage sensitive information, Server C has not been flagged or otherwise indicated to be of interest. Unlike Server B, packet analysis does not indicate any sort of harmful/suspicious activity. Thus, Server C does not receive an extended trace time value. Accordingly, packets from Server C that are older than five minutes (the preselected initial record time) are removed from the rolling buffer and replaced by newer packets associated with Server C if they exist. Alternatively, once Server C is determined to not be of interest, Server C is no longer traced and its packets are no longer stored in the buffer.

Server D may initially undergo a path very similar to Server C, where Server D has not been flagged or otherwise indicated to be of interest at first. Thus, like Server C, Server D does not receive an extended trace time value, and therefore packets from Server D that are older than five minutes (the preselected initial record time) are removed from the rolling buffer and replaced by newer packets associated with Server D if they exist. Indeed, assume that Server D is determined to not be of interest, and therefore Server D is no longer traced and its packets are no longer stored in the buffer. However, at a later point in time when it is not being recorded, this server is flagged as being a potential problem, e.g., from independent packet analysis. At this point, Server D would transition back to a different state where its packets are subject to recording, e.g., in any of the short 5 minute buffer, in the medium length buffer, or even in the perpetual storage, depending upon the type of issue that is identified.

In many networks, most hosts or endpoints correspond to example Server C, above. That is, they are initially recorded in the rolling buffer, but no longer followed or recorded after it is determined that they are not of interest (e.g., not flagged as sensitive or not generating suspicious/anomalous activity). This allows a trace engine to efficiently implement network threat analysis regardless of network size and throughput because only interesting hosts are "tagged" and further monitored, while uninteresting traffic is weeded out early.

In some embodiments, trace time values may be assigned on a session basis instead of a host basis. For example, instead of directing any packets from Server B to the extended rolling buffer, a particular session of Server B (for example a session between Server B and C) may be directed to the extended rolling window. Further, in some embodiments, only two levels of recording may be implemented. For example, there may be a five-minute rolling buffer and long term storage, with no intermediary medium storage buffer. In this embodiment, hosts or sessions not flagged to be packet captured are no longer stored in the rolling buffer after five minutes.

Further, in some embodiments, hosts communicating in a given session are not required to maintain a connection or session between one another to be tracked by the trace engine. Continuing the example above, Server C is deemed not of interest so after five minutes its packets are no longer stored to the rolling buffer. However, the five minutes worth of packets may still be stored to long term memory for later tracing/analysis purposes, so that different sets of packets five minutes long can be bridged together and identified as being generated from the same server, Server C. This may occur when a server or host periodically changes its identity or initiates new sessions, possibly to avoid being monitored.

Figure 1:
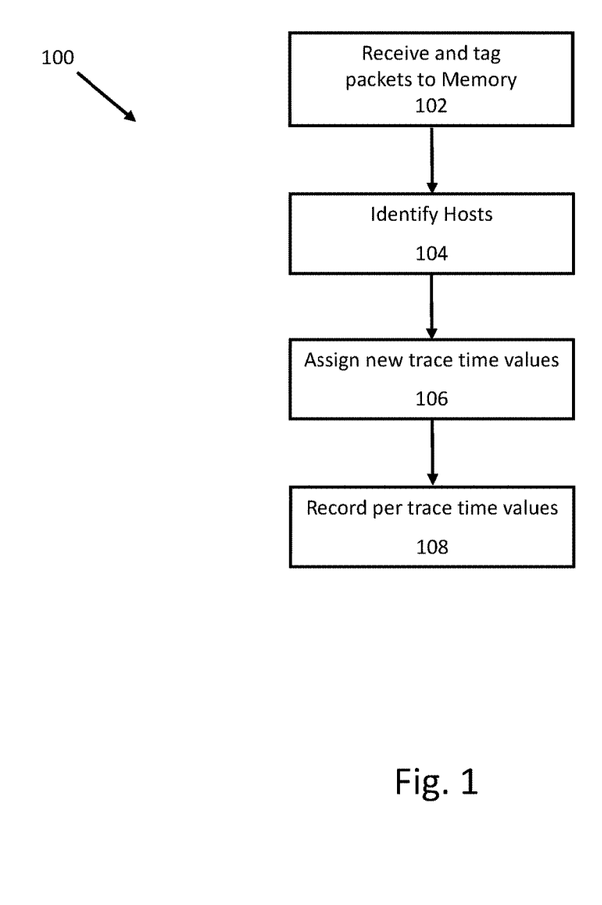
FIG. 1 shows a flowchart for an approach for high-volume network threat tracing, as according to some embodiments.

FIG. 1 shows a flowchart 100 for an approach for high-volume network threat tracing, as according to some embodiments. At 102, network communications such as packets generated by a plurality of host computers (e.g., hosts, clients, endpoints) are received. The packets may be initially stored to a rolling buffer having a certain time window length, such as five minutes wide. Accordingly, the packets are received and tagged in that they are stored to the buffer in memory. At 104, a policy engine may implement one or more machine learning algorithms, malware detectors, look-ups, and/or other algorithms to analyze the packets in the buffer to identify their corresponding hosts or network endpoints. Host identification may be performed by inspecting packet headers for IP addresses or other identifying information. Further, in some embodiments, the hosts may not be positively identified but nonetheless the packets in the five-minute window may indicate suspicious behavior (through detected anomalous behavior as discussed in detail below).

At 106, the policy engine may assign new trace time values to the hosts based at least in part on host identification or identified host behavior. In some embodiments, a user may preconfigure one or more hosts or endpoints as important and preset extended trace time values that are to be assigned to those hosts upon identification. Further, the policy engine may comprise one or more rules that assign extended trace time values based at least in part on how anomalous or suspicious a host's behavior is. For example, if a host connects to a network and then pings 100 network addresses, the host's behavior may be flagged as suspicious or anomalous and a rule may assign an extended trace time value based the level of anomalous activity.

At 108, packets are stored according to the trace time values. Packets that are not assigned extended trace time values expire and may be removed from the rolling buffer. In contrast, packets from hosts that have been assigned new trace time values at 106 are recorded until their trace time value expire. In some instances, as mentioned, the packets may be recorded indefinitely upon the analysis at 106 (e.g., host identification or highly anomalous behavior). In this way, the amount of packets stored to memory can be drastically reduced because only packets from interesting hosts are recorded to longer term memory.

Figure 2:
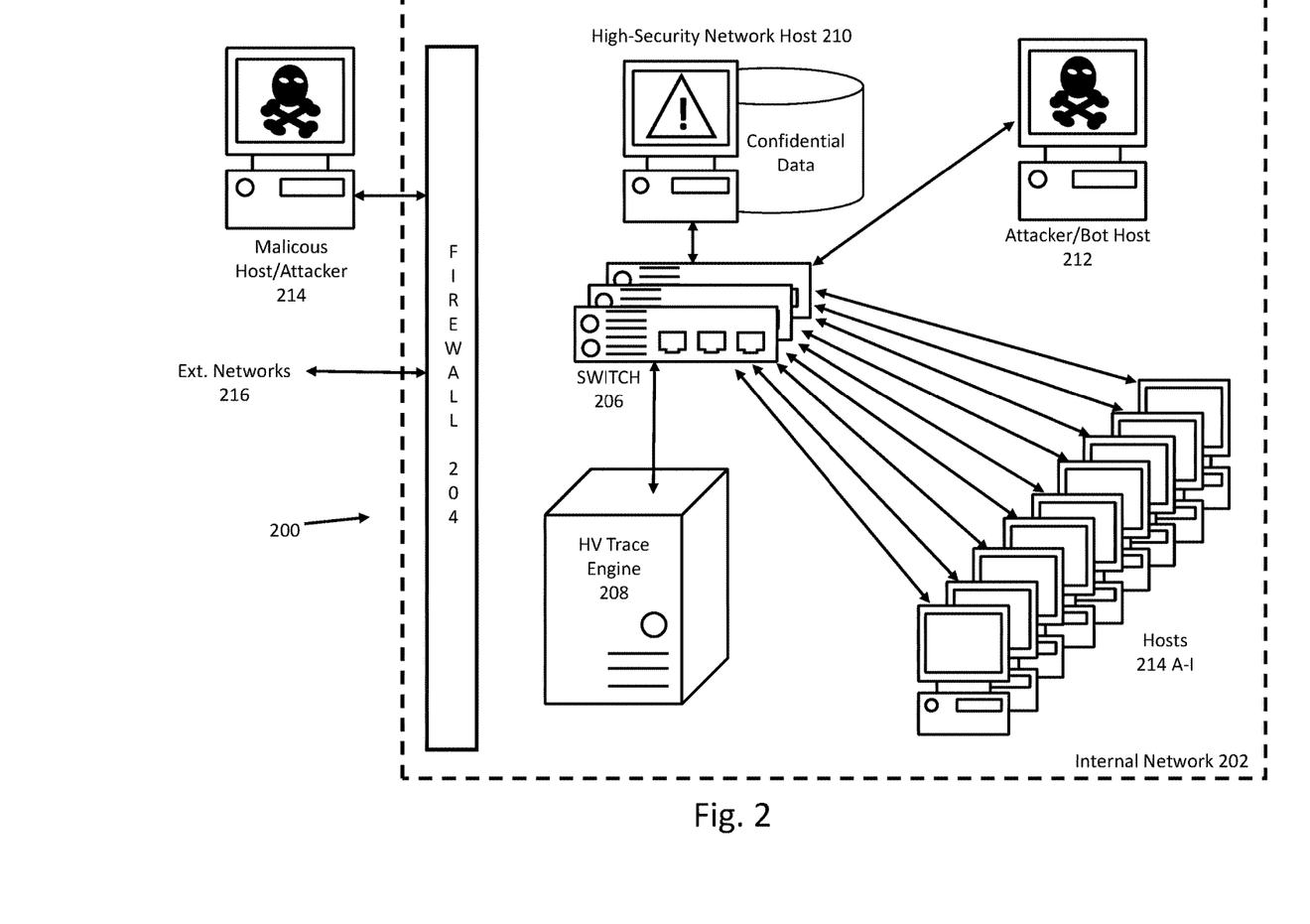
FIG. 2 illustrates a high-volume network threat tracing engine operating in a network, as according to some embodiments.

FIG. 2 illustrates a high-volume network threat tracing engine 208 operating in a network environment 200, as according to some embodiments. As illustrated, network environment 200 comprises an internal network 202, which includes one or more host computers, including for example a high-security network host 210 which controls/manages access to sensitive or confidential data; an infected host 212 that has been infected or compromised by malware or an outside attacker (e.g., malicious attacker 214); as well as a plurality of hosts 214A-I of unknown security risk. In some embodiments, the hosts may communicate with one another through one or more network devices, such as one or more network switches 206. The internal network 202 may communicate with external networks 216 through one or more network border devices, such as a firewall 204. Though the hosts 210, 212, 214A-I are illustrated as isolated in the internal network 202, one of ordinary skill in the art appreciates that the approaches disclosed herein may be implemented on individual computers that are not part of an internal network, or any other computing environment.

In some embodiments, as illustrated, the trace engine 208 may tap one or more network switches 206 to passively analyze the internal network traffic in a way that does not harm or slow down the network (e.g. by creating a copy of the network traffic). In some embodiments, the trace engine 208 is an external module that is coupled to the switch 206 (as illustrated in FIG. 2). While in some embodiments, the trace engine 208 may be directly integrated into network components, such as one of the switches 206 or a firewall 210. While still, in some embodiments the trace engine may be integrated into one or more hosts (e.g. hosts 210, 212, 214A-I) in a distributed fashion (e.g. each host may have its own set of instructions, the hosts collectively agree to follow or adhere to the instructions to collect information and report information to one another or a database). Still in some embodiments, the trace engine may be integrated into a single host (e.g., host 214B of hosts 214A-I) that performs the trace engine's actions for the internal network 202. While the trace engine 208 is discussed here as a tracing device, the trace engine may incorporate other network security engines. Further details of example engines and security devices that may be implemented with the trace engine are described in: U.S. patent application Ser. No. 14/643,931, titled "A system and method for detecting intrusions through real-time processing of traffic with extensive historical perspective", and U.S. patent application Ser. No. 14/944,128, titled "Method and system for detecting threats using passive cluster mapping", which are hereby incorporated by reference in their entirety.

Figure 3:
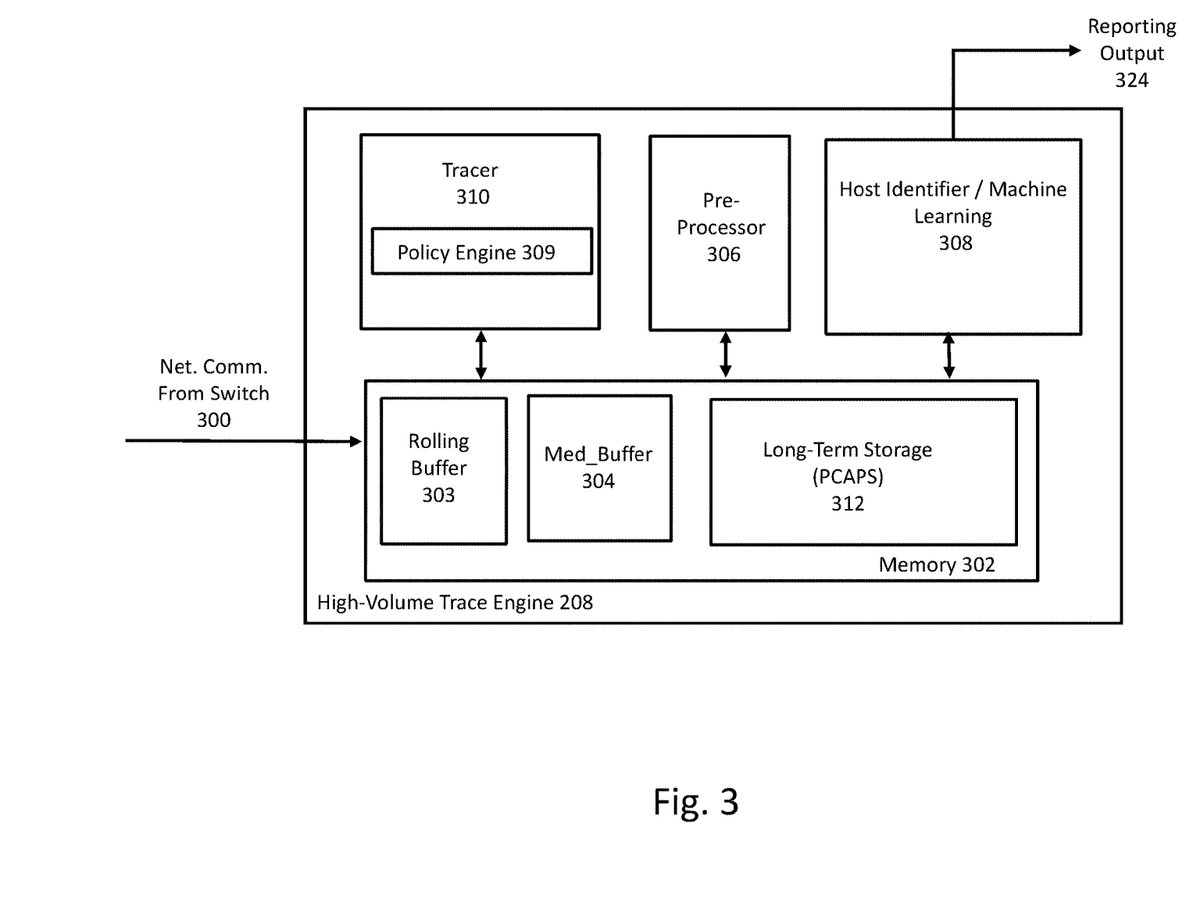
FIG. 3 shows example internal mechanisms for the trace engine, as according to some embodiments.

FIG. 3 shows example internal mechanisms for the trace engine, as according to some embodiments. At 300, network communications are received from the plurality of hosts in a network. The network communications comprise packets which may initially be stored in a rolling buffer 303, which may be located on volatile or non-volatile storage or memory 302 of the trace engine. In some embodiments, the buffer 303 initially records all received traffic for an initial duration of time, such as five minutes. During the five minute window, the tracer engine 208 may use a policy engine 309 within tracer 310 to analyze the packets and identify hosts or characterize host behavior. In some embodiments, the initial recording time can be modified based on the number of hosts to be recorded, the size of memory 302 or other network parameters, such as the typical amount of traffic generated by n number of hosts. In some embodiments, the rolling buffer may be implemented in a least recently used (LRU) manner, such that if more room (memory space) is needed to record new hosts, the packets that are the least recently used (e.g., oldest) are removed to make room for packets from the new host. Accordingly, herein, packets in the rolling buffer may be referred to as being assigned an initial trace time value, which may be extended.

As discussed above, upon host identification extended trace time values may be assigned to the hosts or sessions. For example, if the host is exhibiting somewhat anomalous behavior, packets from the host may be routed to medium size rolling buffer 304, which is a rolling buffer of extended size (e.g., 30 minutes). During this extended time, behaviors that may have not manifested in the rolling buffer 303 may become apparent over the longer time window of the medium size rolling buffer 304. Further, in some cases, one or more hosts may be preselected such that once they are identified, some or all traffic may be immediately packet captured and stored as one or more PCAP files in long term storage 312. For example, referring to FIG. 2, once the trace engine 208 identifies the high-security network host 210 as a host that manages sensitive data, packet capture may be initiated by the trace engine 208 to capture some or all traffic upstream and downstream of host 210.

In some embodiments, the PCAP files may then be processed by the pre-processor 306 that is configured to parse the PCAPs into sub-sets of data that corresponds to sessions between hosts (e.g., session datasets) each of which may contain feature information describing a session between two hosts. The session datasets generated by the pre-processor 306 may be passed to a host identifier or machine learning module 308, with reporting of results made through reporting output 324. In some embodiments, module 308 is configured to analyze feature data in the multiple session datasets and create a network map that statistically describes the network being monitored (e.g., internal network 202). For example, in calmer networks, a host that quickly connects to multiple internal hosts in a repetitive manner (e.g., two POSTs, two GETs, similar message/payload sizes) will statistically standout as anomalous behavior. Notably, by implementing a tracer 310 before pre-processor 306, the amount of data to be processed by pre-processor 306 and delta classifier 308 can be drastically reduced because the tracer only traces host traffic of interest. Further details of detection schemes that may be implemented with the trace engine are described in: U.S. patent application Ser. No. 14/643,931, titled "A system and method for detecting intrusions through real-time processing of traffic with extensive historical perspective", and U.S. patent application Ser. No. 14/944,128, titled "Method and system for detecting threats using passive cluster mapping", which are hereby incorporated by reference in entirety.

Figure 4:
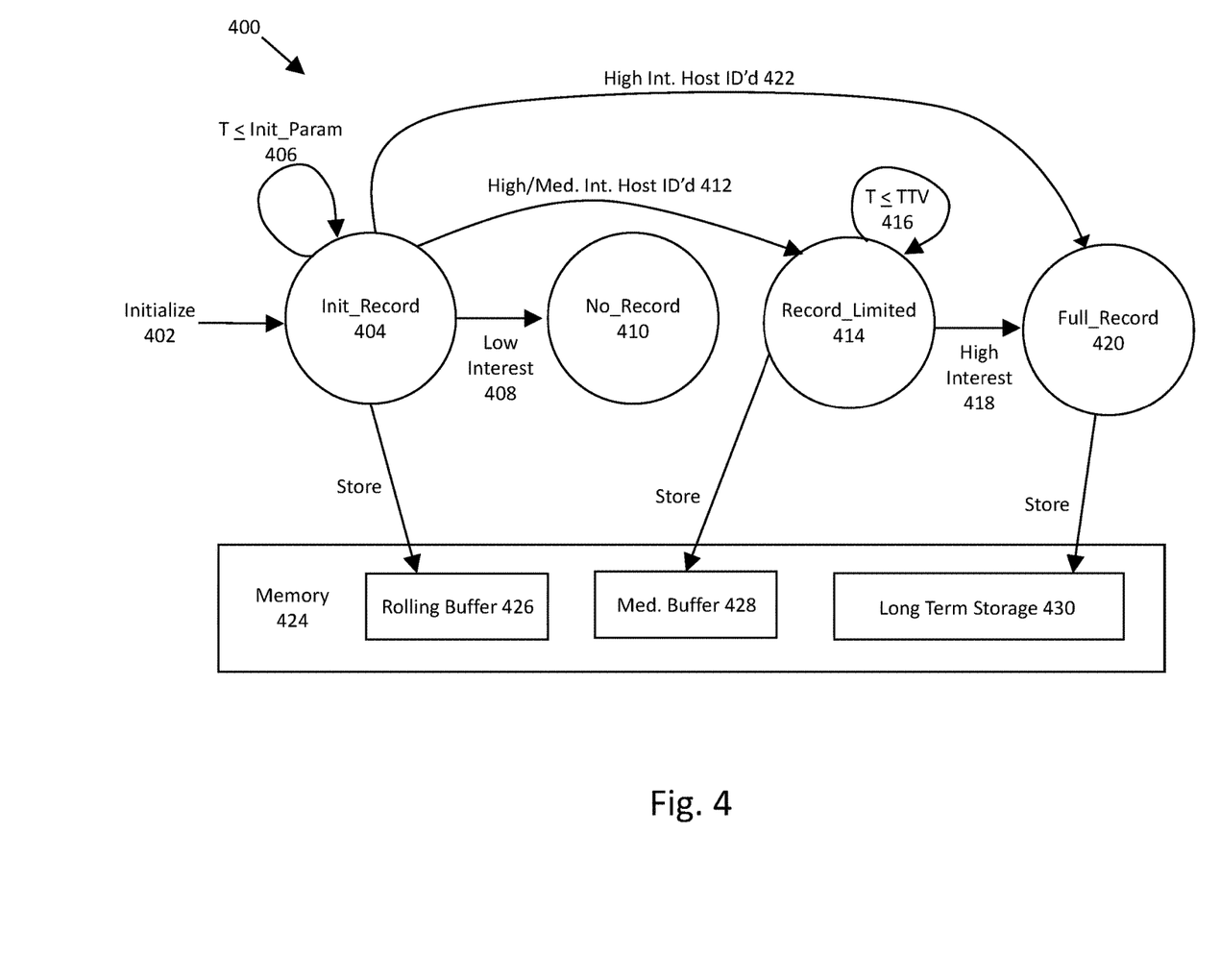
FIG. 4 shows a state flow mechanism for a high-volume threat tracing engine, as according to some embodiments.

FIG. 4 shows a state flow diagram 400 for a high-volume threat tracing engine, as according to some embodiments. At 400, network traffic is received by the tracing engine and kept in the initial record state 404. During this state, the network traffic may be stored to rolling buffer 426 located in tracer memory 424. As illustrated the buffer may be implemented as rolling buffer that stores all packets within a time window and packets older than the time window are discarded and replaced with newer packets. In some embodiments, the time window length may be set as a variable such as init_param, which may be assigned a numerical value, such as five minutes. Thus, packets that are received at time T are kept in the initial record state 404 (and recorded in the rolling buffer) so long as the packet receive time T is less than the rolling buffer time window variable, init_param, as illustrated at 406.

During the initial record state 404, the network traffic may be analyzed to identify the hosts that generated the traffic (e.g., determine which host generated which corresponding packet(s)). A policy engine may be consulted to determine whether identified hosts are sensitive and/or otherwise important and should be tracked further (e.g., a host managing a confidential data). Also during the initial record state 404, the packets may be analyzed by one or more anomalous/suspicious behavior detection schemes to determine if the network traffic is suspicious, anomalous, or otherwise of some other interest, as explained above. As illustrated at 408, in the case where the network traffic is not of interest (e.g., not pre-selected or pre-tagged as important, or otherwise non-anomalous), the host network traffic is, at no_record state 410, designated as being no longer recorded.

Alternatively, where the network traffic is indicated as somewhat anomalous, for example as may be indicated by a machine learning or anomaly detection scheme, the network traffic can be moved/transitioned 412 to a limited record state 414, where the hosts are assigned an extended trace time value that is longer than the initially assigned trace-time value but still not perpetual in duration. The length of different extensions of a given trace time value may be assigned manually by an admin. While optionally, in some embodiments, the policy engine may use a lookup table to assign different values of extended trace time values that depend on what kind of host identification event caused transition 412. For example, packets exhibiting highly anomalous behavior may cause a host to be assigned an extended trace time value of one-hour, while packets exhibiting medium-high anomalous behaviors may be assigned an extended trace time value of 30-minutes. Generally, as according to some embodiments, packets having unexpired extended trace time values are recorded in the medium buffer 428 so long as the extended trace time value is unexpired, as illustrated at 416. Further, while in the record limited state 414, analyzers may analyze the packets over the extended window of time to detect malicious behaviors that manifest or become apparent over longer periods of time. For example, packets corresponding to a malicious host performing slow network reconnaissance may not be recognizable in the five-minute long rolling buffer 426, but may be more easily recognized if recorded over 1-hour in the medium buffer 428. If over the longer period of time, suspicious behavior is detected the hosts/clients associated with the packets may be moved/transitioned 418 to a full record state 420, in which full packet capture is performed (PCAP recording), which may be stored in long term storage 430.

Alternatively, as illustrated at 422, traffic may transition directly from the initial record state 404 to the full record state 420. For example, assume the initial record trace time value is 5-minutes. During the 5-minute record window packets associated with a new host exhibit highly anomalous behavior, as indicated by high confidence from a machine learning algorithm. For instance, the new host may have connected to the network and immediately tried to send the same payload to all available hosts, which may be indicative of a computer worm/virus spreading. While the new host may not have been positively identified as a sensitive asset, nonetheless the way the new host is acting indicates to the policy engine or admin that the new host should be continuously monitored/tracked. As such, the new host may be moved/transitioned along 418 by assigning the new host a perpetual trace time value, which keeps the new host in full record state 420, where all packets associated with the new host are continuously recorded to long term storage 430, for example as one or more PCAP files.

Figure 5:
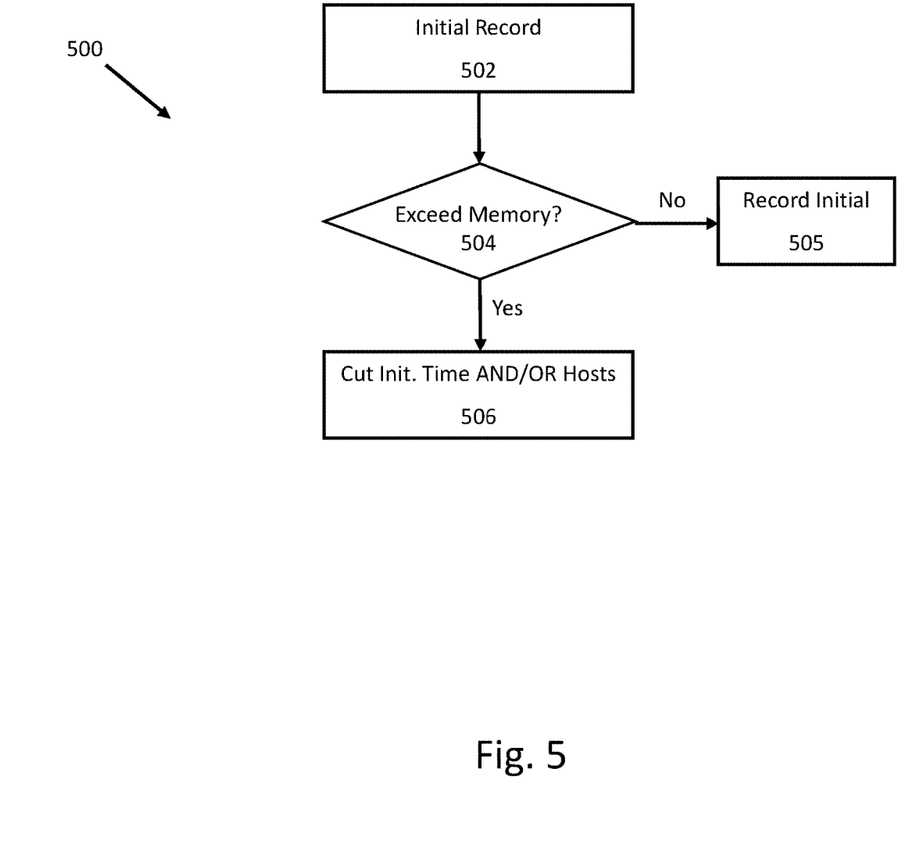
FIG. 5 shows a flow for memory management, as according to some embodiments.

FIG. 5 shows a flow 500 for memory management. In some situations, too many new hosts are identified and the initial recordings of the respective hosts can exceed the available memory. For instance, a low-storage space issue may occur when the trace engine is powered-on and all hosts in the network are "new" to the trace engine, and thus all initially recorded. In some cases, this may occur the trace engine has been running for a period of time normally but one or more additional hosts causes an overload of initial recordings. In these cases, the trace engine may employ back-up policies, as is shown by flow 500. At 502, initial recording is initiated for one or more hosts. At 504, a check occurs as to whether there is sufficient memory to record host traffic. If there is sufficient memory, then at 505 initial recording continues. In some cases, the check at 504 occurs before initial recording is initiated.

However, if at 504 memory is exceeded or projected to exceed the available space, then at 506, the time initial recording time for all hosts currently being initially recorded may be decreased. For example, the trace engine may be natively configured (e.g., configured out of the box) with 30 minutes of initial record time. But when a flood of hosts (or host traffic per hosts) increases so as to exceed memory space, the initial recording time may be lowered from 30 minutes to 10 minutes or 5 minutes. The decreased initial recording time may be kept at its lowered value until hosts are moved to the zeroed out no recording state (see no_record 410). In some embodiments, the relationship between the initial recording time and number of hosts being recorded is dynamic and/or proportional. For example, as the number of hosts being initially recorded increases, the duration of time for which the hosts are initially recorded decreases. For example, in a network where the tracer is set to record and analyze network traffic for 30 minutes by default before moving the hosts to a no record state, if a sudden increase in the number of hosts being initially recorded occurs, the initial recording time may be decreased, for example, to 10 minutes, thus allowing the tracer to still analyze the new hosts. Similarly, as the number of hosts being initially recorded decreases, the duration of time for which the hosts are initially recorded increases.

Figure 6:
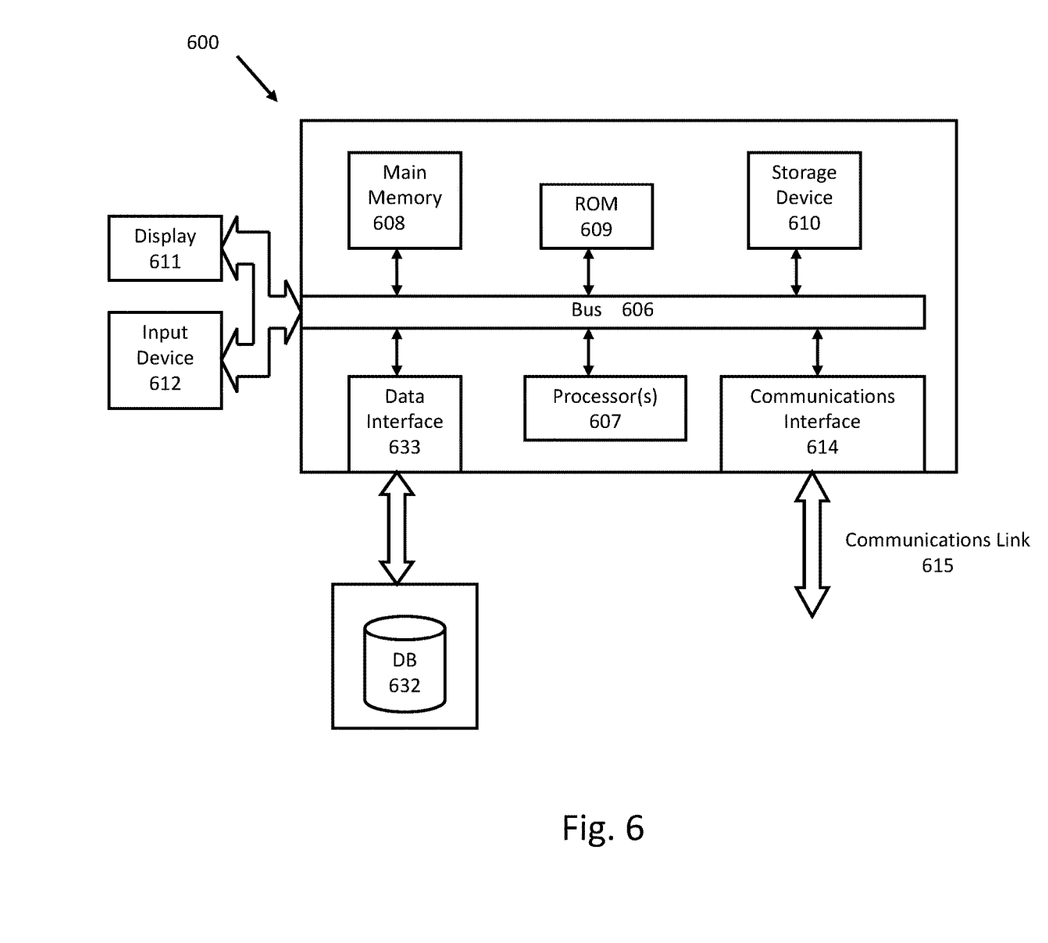
FIG. 6 illustrates example system architecture.

FIG. 6 illustrates example system architecture, as according to some embodiments. FIG. 5 is a block diagram of an illustrative computing system 600 suitable for implementing an embodiment of the present invention for performing intrusion detection. Computer system 600 includes a bus 606 or other communication mechanism for communicating information, which interconnects subsystems and devices, such as processor 607, system memory 608 (e.g., RAM), static storage device 609 (e.g., ROM), disk drive 610 (e.g., magnetic or optical), communication interface 614 (e.g., modem or Ethernet card), display 611 (e.g., CRT or LCD), input device 612 (e.g., keyboard), and cursor control. A database 632 may be accessed in a storage medium using a data interface 633.

According to one embodiment of the invention, computer system 600 performs specific operations by processor 607 executing one or more sequences of one or more instructions contained in system memory 608. Such instructions may be read into system memory 608 from another computer readable/usable medium, such as static storage device 609 or disk drive 610. In alternative embodiments, hard-wired circuitry may be used in place of or in combination with software instructions to implement the invention. Thus, embodiments of the invention are not limited to any specific combination of hardware circuitry and/or software. In one embodiment, the term "logic" shall mean any combination of software or hardware that is used to implement all or part of the invention.

The term "computer readable medium" or "computer usable medium" as used herein refers to any medium that participates in providing instructions to processor 607 for execution. Such a medium may take many forms, including but not limited to, non-volatile media and volatile media. Non-volatile media includes, for example, optical or magnetic disks, such as disk drive 610. Volatile media includes dynamic memory, such as system memory 608.

Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can read.

In an embodiment of the invention, execution of the sequences of instructions to practice the invention is performed by a single computer system 600. According to other embodiments of the invention, two or more computer systems 600 coupled by communication link 615 (e.g., LAN, PTSN, or wireless network) may perform the sequence of instructions required to practice the invention in coordination with one another.

Computer system 600 may transmit and receive messages, data, and instructions, including program, i.e., application code, through communication link 615 and communication interface 614. Received program code may be executed by processor 607 as it is received, and/or stored in disk drive 610, or other non-volatile storage for later execution.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

What is claimed is:

1. A method for selectively storing network traffic, comprising:
    storing a set of network packets received from a plurality of hosts in an initial recording data structure, wherein the set of network packets are maintained in the initial recording data structure while the set of network packets are within a corresponding initial trace time window;
    storing a subset of the set of network packets in a second recording data structure based at least in part on an identification of anomalous activity of a host, the subset of the set of network packets comprising network packets received from the host of the plurality of hosts, the anomalous activity being identified by processing the subset of the network packets, wherein the host is assigned an extended trace time window and the subset of the set of network packets are maintained in the second recording data structure while the extended trace time window has not expired, wherein the extended trace time window expires later than the initial trace time window; and
    storing a new network packet from the host in the second recording data structure based at least in part on a determination that the extended trace time window has not expired.

2. The method of claim 1, wherein an expiration of an extended trace time window for the host automatically terminates storing network packets generated by the host to the second recording data structure.

3. The method of claim 1, further comprising storing the new network packet from the host to a long-term memory structure configured to record network traffic perpetually.

4. The method of claim 1, wherein the extended trace time window are assigned using a lookup memory structure that stores host identifiers and corresponding extended trace time windows to be assigned.

5. The method of claim 1, wherein the extended trace time window is proportional to how anomalous the anomalous activity is as characterized by a machine learning scheme.

6. The method of claim 1, wherein the initial trace time window is decreased in response to an amount of the initial recording data structure memory capacity used.

7. The method of claim 1, wherein the subset of the set of network packets are stored as one or more packet capture files.

8. The method of claim 1, wherein a portion of the set of network packets are not associated with extended trace time windows, and wherein the portion of the set of network packets is not stored in the second recording data structure.

9. A system for selectively storing network traffic, comprising:
    a memory storing a set of program code instructions; and
    a processor that executes the set of program code instructions to perform a set of acts, the set of acts comprising:
        storing a set of network packets received from a plurality of hosts in an initial recording data structure, wherein the set of network packets are maintained in the initial recording data structure while the set of network packets are within a corresponding initial trace time window;
        storing a subset of the set of network packets in a second recording data structure based at least in part on an identification of anomalous activity of a host, the subset of the set of network packets comprising network packets received from the host of the plurality of hosts, the anomalous activity being identified by processing the subset of the network packets, wherein the host is assigned an extended trace time window and the subset of the set of network packets are maintained in the second recording data structure while the extended trace time window has not expired, wherein the extended trace time window expires later than the initial trace time window; and
        storing a new network packet from the host in the second recording data structure based at least in part on a determination that the extended trace time window has not expired.

10. The system of claim 9, wherein an expiration of an extended trace time window for the host automatically terminates storing network packets generated by the host to the second recording data structure.

11. The system of claim 9, the set of acts further comprising storing the new network packet from the host to a long-term memory structure configured to record network traffic perpetually.

12. The system of claim 9, wherein the extended trace time window are assigned using a lookup memory structure that stores host identifiers and corresponding extended trace time windows to be assigned.

13. The system of claim 9, wherein the extended trace time window is proportional to how anomalous the anomalous activity is as characterized by a machine learning scheme.

14. The system of claim 9, wherein the initial trace time window is decreased in response to an amount of the initial recording data structure memory capacity used.

15. The system of claim 9, wherein the subset of the set of network packets are stored as one or more packet capture files.

16. A computer-program product embodied on a non-transitory computer readable storage medium having stored thereon a sequence of instructions which, when executed by a processor, causes a set of acts for selectively storing network traffic, the set of acts comprising:
storing a set of network packets received from a plurality of hosts in an initial recording data structure, wherein the set of network packets are maintained in the initial recording data structure while the set of network packets are within a corresponding initial trace time window;
storing a subset of the set of network packets in a second recording data structure based at least in part on an identification of anomalous activity of a host, the subset of the set of network packets comprising network packets received from the host of the plurality of hosts, the anomalous activity being identified by processing the subset of the network packets, wherein the host is assigned an extended trace time window and the subset of the set of network packets are maintained in the second recording data structure while the extended trace time window has not expired, wherein the extended trace time window expires later than the initial trace time window; and
storing a new network packet from the host in the second recording data structure based at least in part on a determination that the extended trace time window has not expired.

17. The computer-program product of claim 16, wherein an expiration of an extended trace time window for the host automatically terminates storing network packets generated by the host to the second recording data structure.

18. The computer-program product of claim 16, the set of acts further comprising storing the new network packet from the host to a long-term memory structure configured to record network traffic perpetually.

19. The computer-program product of claim 16, wherein the extended trace time window are assigned using a lookup memory structure that stores host identifiers and corresponding extended trace time windows to be assigned.

20. The computer-program product of claim 16, wherein the extended trace time window is proportional to how anomalous the anomalous activity is as characterized by a machine learning scheme.

21. The computer-program product of claim 16, wherein the initial trace time window is decreased in response to an amount of the initial recording data structure memory capacity used.

22. The computer-program product of claim 16, wherein the subset of the set of network packets are stored as one or more packet capture files.

23. The computer-program product of claim 16, wherein a portion of the set of network packets are not associated with extended trace time windows, and wherein the portion of the set of network packets is not stored in the second recording data structure.

\* \* \* \* \*